United States Patent Office 2,745,762
Patented May 15, 1956

2,745,762
ASPHALTIC WATERPROOF ADHESIVE

Adolph Soderberg, Salt Lake City, Utah

No Drawing. Application January 3, 1952,
Serial No. 264,850

8 Claims. (Cl. 106—273)

This invention relates to waterproof adhesives and sealing compounds as used in the manufacture and sealing of waterproof case linings and bags to effect tight and waterproof seams, joints, and closures for a variety of purposes, chiefly the packing of items for overseas shipment.

Characteristics desirable for an adhesive of this type have long been recognized, though available adhesives have fallen considerably short of requirements in one way or another.

Thus, a principal requisite is strength to resist rough handling. Along with this, however, should be retention of flexibility at low temperatures to prevent cracking, retention of an effective tenacity at the high temperatures met in tropical areas, high impermeability to moisture at both extremes of temperatures, easy and rapid applicability to all types of paper stock, quick sealability, and low cost.

The art has long been seeking an adhesive possessing all of these qualities.

In accordance with the present invention, I have compounded a composition of matter satisfying all of these requirements, and capable of production in quantity sufficient to satisfy all reasonable demand therefore.

I have found that a hydrocarbon polymer of the type of polyisobutelene (commercially known as "polybutene") of low molecular weight, namely, below approximately 500, is compatible with asphalt to an extent which renders the resulting composition stable under all conditions to which an adhesive of the type concerned is normally subjected, and, furthermore, that such composition has all the desirable and sought for attributes enumerated above.

I am aware that similar polymers of high molecular weight—above 800—are being presently added to asphalts for certain purposes, principally to replace so-called rubberized asphalts in the manufacture of roofing and for road paving, see, for example, the Anderson et al. U. S. Patent No. 2,197,461 of April 16, 1940. Nevertheless, I know of no instance where the usefulness, in conjunction with asphalt, of such polymers of relatively low molecular weight has been recognized heretofore.

A principal object of the invention, therefore, is to produce a superior moisture-proof adhesive, which is primarily useful in the sealing of waterproof barrier materials for packaging purposes, for example case linings, bags, and generally similar packing materials.

In the production of my desired adhesive, utilizing the type of hydrocarbon polymer of low molecular weight specified above, I prefer to employ an air-blown petroleum asphalt having a melt point of from 165 to 180° Fahrenheit, penetration of 25 to 50 hundredths of a centimeter, and ductility in excess of 3 centimeters, at 77° F., the same conforming generally to Types I, II and III asphalt of Federal Specification SS–A–666. Adhesives produced by the use of this type of asphalt are very quick-setting upon cooling. Other types of asphalt having generally similar characteristics, such as natural Trinidad asphalt, may be employed with varying degrees of satisfaction, depending upon the particular use.

I have found an air blown petroleum asphalt to be particularly advantageous in its uniform and effective integration with the polymer.

The hydrocarbon polymer may be any of those specified in the said Anderson et al. Patent No. 2,197,461, so long as the molecular weight is relatively low, i. e. below approximately 500, as contrasted with molecular weights of in excess of 800, called for by the said Anderson et al. patent. I have had particularly good results when the polymer has molecular weight of from 330 to 370, viscosity of 114 to 358 seconds (SSU) at 100° F., specific gravity of from 0.831 to 0.848, and pour point of minus 30° F. to minus 65° F., ASTM.

I have found that the lower the molecular weight of the polymer, the greater the flexibility of the resulting adhesive at reduced temperatures. The optimum range of molecular weight is from approximately 330 to approximately 450.

In compounding the adhesive of my invention, I mix the hydrocarbon polymer in quantities of from approximately 10% to 20% by weight with the asphalt, in a molten condition, in quantities of from approximately 90% to 80%. Best results have been procured within the range of from 15% to 20% polymer and 85% to 80% asphalt.

Adhesives resulting from the preferred procedures outlined above have melt points of from 140° to 145° Fahrenheit, and exhibit greatly increased tackiness over the asphalt alone. They are preferably applied hot, that is to say at temperatures of from 280° to 380° Fahrenheit. As so applied, they penetrate deeply into and between the fibers of cellulosic material, such as paper and paper board, and, after cooling to ordinary temperatures encountered in the use of the sealed barrier materials, resist separation thereof to the extent of pulling apart the cellulosic fibers of the barrier material to which applied. At the colder temperatures at which asphalt alone is very brittle and fails as an adhesive, the adhesive composition of the invention retains all or most of its resistance to separation of both smooth and rough surfaced barrier materials which are sealed together therewith.

I claim:

1. An asphaltic adhesive as described, comprising an intimate mixture of an asphalt and a polyisobutylene, the latter having molecular weight below approximately 450.

2. An asphaltic adhesive as described, comprising an intimate mixture of an air-blown petroleum asphalt, and a polyisobutylene, the latter having molecular weight below approximately 450.

3. An asphaltic adhesive as described, comprising an intimate mixture of an asphalt of melt point within the range of approximately 165° to 180° Fahrenheit, and a polyisobutylene, the latter having molecular weight within the range of approximately 330 to 370.

4. An asphaltic adhesive as described, comprising an intimate mixture of an air-blown petroleum asphalt of melt point within the range of approximately 165° to 180° Fahrenheit, and a polyisobutylene, the latter having a molecular weight within the range of approximately 330 to 370.

5. The composition of matter defined in claim 1, wherein the polyisobutylene represents from approximately 10% to 20%, and the asphalt from 90% to 80%, by weight thereof.

6. The composition of matter defined in claim 3, wherein the polyisobutylene represents from approximately 10% to 20%, and the asphalt from 90% to 80%, by weight thereof.

7. The process of producing an asphaltic adhesive, comprising mixing a polyisobutylene, having a molecular weight of below approximately 450, with an asphalt in molten condition.

8. An asphaltic adhesive as described, comprising an intimate mixture of an asphalt and a polyisobutylene, the latter having a molecular weight within the range of approximately 330 to 370.

References Cited in the file of this patent

UNITED STATES PATENTS

| | | |
|---|---|---|
| 2,197,461 | Anderson et al. | Apr. 16, 1940 |
| 2,248,749 | Engelhardt | July 8, 1941 |
| 2,408,297 | Cubberley et al. | Sept. 24, 1946 |
| 2,485,625 | Merely et al. | Oct. 25, 1949 |

FOREIGN PATENTS

| | | |
|---|---|---|
| 266,483 | Switzerland | Apr. 17, 1950 |